(12) United States Patent
Fuertes

(10) Patent No.: US 7,473,776 B2
(45) Date of Patent: Jan. 6, 2009

(54) SOLUBLE HYDROGENATED STARCH DERIVATIVES CONTAINING NONDIGESTIBLE DIETARY FIBRES

(75) Inventor: Patrick Fuertes, Lambersart (FR)

(73) Assignee: Roquette Freres, Lestrem (FR)

( * ) Notice: Subject to any disclaimer, the term of this patent is extended or adjusted under 35 U.S.C. 154(b) by 431 days.

(21) Appl. No.: 10/281,686

(22) Filed: Oct. 28, 2002

(65) Prior Publication Data

US 2003/0096055 A1 May 22, 2003

(30) Foreign Application Priority Data

Oct. 30, 2001 (FR) .................................. 01 14091

(51) Int. Cl.
C08B 31/00 (2006.01)
A31K 31/715 (2006.01)
(52) U.S. Cl. .......................... 536/102; 536/103; 514/60
(58) Field of Classification Search ................ 536/102, 536/103; 514/60
See application file for complete search history.

(56) References Cited

U.S. PATENT DOCUMENTS 4,622,233 A 11/1986 Torres

| | | | |
|---|---|---|---|
| 5,264,568 A | | 11/1993 | Yamada et al. |
| 5,493,014 A | | 2/1996 | Caboche |
| 5,620,873 A | * | 4/1997 | Ohkuma et al. ............... 435/99 |
| 6,630,586 B1 | | 10/2003 | Fouache et al. |
| 6,780,990 B1 | * | 8/2004 | Le ............................. 536/102 |

FOREIGN PATENT DOCUMENTS

| | | | |
|---|---|---|---|
| EP | 338 151 | | 10/1989 |
| EP | 477 089 | | 3/1992 |
| EP | 485 304 | | 5/1992 |
| EP | 516 491 | | 12/1992 |
| EP | 368 451 | | 4/1994 |
| EP | 530 111 | | 6/1999 |
| JP | 02276556 A | * | 11/1990 |
| JP | 2000169502 A | * | 6/2000 |
| WO | WO 92 14761 | | 9/1992 |

OTHER PUBLICATIONS

Article Englyst & Cummings, american Journal of Clinical Nutrition, "Digestion of polysaccharides of potato in the small intestine of man" 1987, vol. 45 pp. 423-431.
Patent abstract of JP 62 091 501 A.

* cited by examiner

*Primary Examiner*—Shaojia Anna Jiang
*Assistant Examiner*—Everett White
(74) *Attorney, Agent, or Firm*—Young & Thompson

(57) ABSTRACT

The invention relates to soluble hydrogenated starch derivatives containing nondigestible dietary fiber, characterized in that they have an ICUMSA coloration value reduced by at least 50%, and a reducing sugar content reduced by at least 30%, and to their method of preparation.

11 Claims, No Drawings

SOLUBLE HYDROGENATED STARCH DERIVATIVES CONTAINING NONDIGESTIBLE DIETARY FIBRES

The present invention relates to soluble hydrogenated starch derivatives containing nondigestible dietary fibres.

More particularly, the present invention relates to soluble hydrogenated starch derivatives containing hydrogenated nondigestible dietary fibres whose colour is reduced by at least 50%, and whose reducing sugar content is reduced by at most 30% compared with the products from which they are prepared.

The invention also relates to the method of hydrogenation which makes it possible to decolourise and to stabilize in an acidic medium the soluble starch derivatives containing nondigestible dietary fibres without significantly altering their reducing sugar content.

For the purposes of the invention, the expression "soluble starch derivatives containing nondigestible dietary fibres" is understood in particular to mean starch derivatives produced by the combination of hydrolysis and transglucosylation reactions (which occur during hydrolysis reactions) which confer on the said starch derivatives properties identical to dietetic fibres.

These dietetic fibres are recognized by persons skilled in the art for their beneficial effects on human health. These fibres are generally classified into two categories: soluble fibres and insoluble fibres.

Soluble fibres, such as pectin and inulin, are fermented by the intestinal bacterial flora. This fermentation releases short-chain fatty acids into the colon, which have the effect of reducing the pH thereof and, consequently, of limiting the development of pathogenic bacteria.

Insoluble fibres, such as cellulose, resistant starches, or maize or soya bean fibres have an essentially mechanical role in the gastrointestinal tract. They are only very slightly fermented by the intestinal flora and contribute to reducing the duration of intestinal transit.

A number of technologies developed so as to treat starch in order to confer dietary fibre properties on it, and to thus obtain resistant starches, are known in the state of the art (ENGLYST and CUMMINGS in *American Journal of Clinical Nutrition* in 1987, volume 45 pp 423-431).

Conventionally, starch is treated with a dietary acid at high temperature. This heat treatment will then generate starch derivatives of the type such as pyrodextrins, white or yellow dextrins, according to the dose of acid, the water content of the starches, and the temperature ranges used, these starch derivatives being resistant to digestion and to absorption in the small intestine in humans.

Indeed, while standard starches and maltodextrins possess only α-1,4 and α-1,6 type glucoside bonds, heat treatment under acidic conditions will also produce atypical bonds of the 1,2 and 1,3 type (as α or β anomerisms) which are not hydrolyzed by human digestive enzymes.

These physical treatments are often supplemented by enzymatic treatments in order to reinforce the dietary fibre character of the starch derivatives thus obtained. In the patents EP 368,451 and U.S. Pat. No. 5,264,568, for example, a method for preparing pyrodextrins is thus described, the dietary fibre characteristics of which are reinforced by the action of an α-amylase or of several α-amylases successively on a dextrin or on a pyrodextrin in solution at high temperature.

In EP Patent 530,111, indigestible dextrins are described which are obtained by extrusion of dehydrated acidified maize starch under particular conditions. This treatment may be supplemented by the action of a heat-resistant α-amylase.

The applicant company has also described, in its Patent Application EP 1,006,128, "branched maltodextrins" having between 15 and 35% of 1-6 glucosidic bonds, a reducing sugar content of less than 20%, a polydispersity index of less than 5 and a number-average molecular mass Mn at most equal to 4500 g/mol.

These branched maltodextrins especially exhibit an indegestibility feature whose consequence is to reduce their calorific value, by preventing their assimilation in the small intestine, and they thus constitute a source of indigestible fibre.

As a guide, their insoluble fibre level is generally greater than 50% on a dry matter basis, a value determined according to the AOAC method No. 985-29 (1986).

However, the preparation of all these starch derivatives at high temperature is accompanied almost simultaneously by a problem of coloration of the said products.

These problems of coloration may appear first of all upstream, at the time of production of the soluble starch derivatives containing nondigestible dietary fibres.

The constraint is then to finely control the settings of the apparatus used. Accordingly, in EP Patent 530,111, the high coloration of the product is partially reduced by limiting the extrusion parameters. A temperature of 170° C. should not be exceeded.

Next, these problems of coloration may appear in the purification steps, as is indicated in Patent Application EP 477,089.

This purification of pyrodextrins treated with α-amylase is conventionally performed on chromatography resins which make it possible to remove the residual glucose from the high-molecular-weight compounds thus obtained.

The purification should then be carried out at a temperature of between 20 and 70° C. in order to avoid problems of coloration, because it was observed that, above 70° C., the product becomes brown and becomes degraded on leaving the said purification columns. However, this temperature control only partially reduces the coloration of the final product.

Accordingly, three solutions are recommended for remedying these problems of coloration, or even of odours.

The first solution consists in using techniques of decolourization on activated charcoal.

Thus, the decolourization of dextrins on activated charcoal or by passage over resins (at a temperature of 20 to 70° C.) is described in Patent Application EP 485,304 and in EP Patent 516,491.

However, as is in fact known to persons skilled in the art, this decolourization technique is cumbersome and tedious, because it not only requires regenerating the charcoal column used, but also demineralizing the decolourized solution thus obtained on a strong cationic resin, and then a weakly basic anionic resin in order to remove all the inorganic salts still present.

The second solution consists in adding bleaching agents to the solution to be decolourized.

The addition of a bleaching agent of the hydrogen peroxide, benzoyl peroxide or sodium chloride type for decolourizing polydextrose is thus described in U.S. Pat. No. 4,622,233.

However, these bleaching agents are not neutral, and also alter the physical nature of the products to be decolourized. This disadvantage would be even more marked for soluble starch derivatives containing nondigestible dietary fibres.

A third solution, which is more satisfactory than the preceding two, consists in hydrogenating the product to be decolourized.

Indeed, without being bound by any theory, the coloration phenomena are conventionally attributed to the presence of unsaturated bonds in products which are likely to become coloured at high temperature.

Either these unsaturated bonds are linked to the reducing power of the starch derivatives: they are then carbonyl functional groups which, in the presence of nitrogen-containing derivatives, give, at high temperature, the coloured products of the MAILLARD reaction.

Or these unsaturated bonds correspond to bonds of the alkene type (which are generated indirectly during the reaction in acidic medium at high, or even very high, temperature) or products of polymerization and dehydration (humin-type products).

The hydrogenation of polydextrose (or of polymaltose) as a solution to these problems of bad taste (linked to anhydroglucose) and of colour is for example described in Patent Application WO 92 14761.

It was known to overcome this drawback by treatment in a solvent with a bleaching agent, but the preferred technique proposed in Patent Application WO 92 14761 consists in heating in the presence of a hydrogenation catalyst and of hydrogen.

The catalytic hydrogenation is thus carried out with a nickel-type catalyst at a pH close to neutrality, at high pressures and temperatures (between 90 and 120 bar and between 140 and 160° C.) and at a reaction time of 30 minutes to 1 hour.

It is also possible to use a reducing agent such as sodium or potassium borohydride.

For example, for the reaction with sodium borohydride, the reaction requires at least 0.5% of the said borohydride, and requires working at a regulated alkaline pH, of between 9 and 12, and a temperature which may be up to 80° C.

The contaminating borate ions are then removed by passing through methanol or over an ion exchanger. Finally, the reduced polydextrose is purified over one or more ion-exchange resins.

However, these two methods, while they lead to polydextrose being effectively decolourized, generate a product which no longer exhibits any reducing power, the conditions for total hydrogenation used completely removing any source of unsaturated bonds from the molecule.

To remedy this problem, it has been proposed, in EP Patent 338,151, to work under more gentle conditions in order to ensure the decolourization of glycosides by hydrogenation.

The glycosides here are n-butyl glucoside or alkyl glucoside type compounds which exhibit the disadvantage. of having a colour ranging from "dark yellow" to "black coffee", linked to the "humin" type contaminants.

Rather than using, here again, adsorbent resins, reducing acids or bleaching agents to remove these contaminants, it is therefore proposed to use a particular catalytic hydrogenation technique.

Catalytic hydrogenation is thus carried out under conditions of duration which may be up to 6 to 12 hours, with a catalyst chosen from catalysts of groups IB, IIIB, IVB, VI, VII and VIII, the preferred metals being Ni, Pt, Ga, Pd, Co and Mo, with or without a promoter.

The reaction temperature is lower, between 40 and 50° C., but the reaction pH should be at least 8 and preferably between 10 and 13, still more preferably between 11 and 12, because the alkyl glucosides are stable compounds in alkaline medium.

The hydrogenation pressure used is in addition high, of the order of 140 bar.

The result of the preceding text is that the known technologies are not a priori adapted to the decolourization of soluble starch derivatives containing nondigestible dietary fibres, except at the expense of their physicochemical characteristics, such as the reducing power, or at the expense of their stability at acidic pH, as required, for example, for the branched maltodextrins described above in their application fields.

An unsatisfied need therefore exists to have soluble starch derivatives containing nondigestible dietary fibres which exhibit reduced coloration and which can preserve their physicochemical characteristics, in particular in terms of reducing power, and optionally which may have greater stability over time at acidic pH values.

The applicant company has had the merit of reconciling all these objectives which were until now reputed irreconcilable by devising and producing, at the cost of numerous research studies, novel types of product, namely soluble hydrogenated starch derivatives containing particular nondigestible dietary fibres.

The soluble hydrogenated starch derivatives containing nondigestible dietary fibre in accordance with the invention are thus characterized in that they have:

an ICUMSA coloration value reduced by at least 50%, and a reducing sugar content reduced by at most 30%, compared with the fibre-containing soluble starch derivatives from which they are prepared.

To the best knowledge of the applicant company, to preserve the applicative properties of the soluble hydrogenated starch derivatives containing nondigestible dietary fibre in accordance with the invention, their reducing sugar content should not be 30% lower than that of the starch derivatives from which they are prepared.

The measurement of the ICUMSA coloration of the hydrogenated or nonhydrogenated soluble starch derivatives containing nondigestible dietary fibres in accordance with the invention is carried out in the following manner.

A solution of hydrogenated or nonhydrogenated soluble starch derivatives is prepared, which contains nondigestible dietary fibres in accordance with the invention, at a concentration of 200 g/l, and the absorbance is measured at 420 nm in a plastic cuvette having an optical path length of 1 cm.

The measurement of ICUMSA coloration is determined by calculating the following ratio:

$$\text{ICUMSA coloration} = \frac{OD \times 10^5}{c \times d}$$

where "OD" is the optical density measured at 420 nm, "c" the concentration of the solution, and "d" its density.

The hydrogenated starch derivatives in accordance with the invention therefore have an ICUMSA coloration value reduced by at least 50%, for a reducing sugar content reduced by at most 30%.

As will be exemplified below, the ICUMSA coloration of certain commercial indigestible dextrins is of the order of 1500 units. Their insoluble fibre level is generally of the order of 25% on a dry matter basis, the value determined according to the AOAC method No. 985-29 (1986), and their reducing sugar content is of the order of 9%.

In accordance with the invention, the applicant company proposes derived products which have an ICUMSA coloration of at most 800 units, preferably of at most 750 units, and a reducing sugar content which is certainly reduced, but is at least 6% on a dry basis.

It is observed, moreover, that their insoluble fibre level is unchanged, and remains of the order of 25%.

As for the ICUMSA coloration of the branched maltodextrins described in patent application EP 1,006,128, a product, for example, characterized by 32% of 1-6 glucoside bonds, a reducing sugar level of 2.5%, a polymolecularity index of 2.15 and a number-average molecular mass Mn of 2480 g/mol has a coloration of the order of 900 units. As indicated above, its insoluble fibre level is of the order of 55% on a dry matter basis, a value determined according to the AOAC method No. 985-29 (1986).

Henceforth, the applicant company can propose the derived products in accordance with the invention with an ICUMSA coloration of at most 400 units, preferably of at most 350 units, and reducing sugar content which is certainly reduced, but is at least 2% on a dry basis.

Here again, it is observed that these hydrogenated starch derivatives containing nondigestible dietary fibres in accordance with the invention have an unchanged insoluble fibre level of the order of 55%.

Additional measurements were in fact carried out in order to determine the variation of the coloration of the hydrogenated starch derivatives in accordance with the invention, as a function of the pH.

This test consists in preparing solutions of soluble starch derivatives containing nondigestible dietary fibres in hydrogenated or nonhydrogenated form at 500 g l, in adjusting the pH of the said solutions to acidic, neutral and basic pH values, and in measuring the colour difference after heating the solutions thus prepared for 15 minutes at 80° C.

As will be exemplified below, the ICUMSA coloration value of the soluble hydrogenated starch derivatives containing nondigestible dietary fibres in accordance with the invention is stable in an acidic medium and exhibits an instability which increases as one approaches alkaline pH values.

This stability at acidic pH allows the use of the soluble hydrogenated starch derivatives containing nondigestible dietary fibres in accordance with the invention in food sectors where the absence of coloration under acidic preparation conditions is required for the applications envisaged.

To prepare soluble hydrogenated starch derivatives containing nondigestible dietary fibres in accordance with the invention, the method of decolourization consists in hydrogenating the said starch derivatives under conditions such that the reducing sugar content is not reduced by more than 30%, while significantly reducing their coloration, i.e. by at least 50%.

In a first method for decolourizing of the soluble starch derivatives containing nondigestible dietary fibres, the hydrogenation of the starch derivatives is carried out with hydrogen in the presence of a catalyst.

The catalyst is advantageously chosen from the group consisting of nickel, ruthenium, palladium and platinum, and preferably nickel.

To adjust the hydrogenation conditions so as to reduce the coloration by a significant factor, i.e. by at least 50%, and so that the reducing sugar content of the hydrogenated soluble starch derivatives containing nondigestible dietary fibres in accordance with the invention does not decrease by more than 30%, the applicant company has found that the operation should be advantageously carried out with a product having a dry matter content of between 10 and 40% on a dry basis, preferably of between 15 and 25% on a dry basis, the hydrogenation then being preferably performed at a temperature of between 30 and 90° C.

Advantageously, the hydrogenation is performed at a pressure of between 1 and 50 bar, for a period of 0.5 to 5 hours, preferably between 0.5 and 2 hours.

The applicant company has had the merit of having selected the operating conditions which make it possible to best balance the hydrogenation treatment, that is to say decreasing as much as possible the coloration of the product to be treated, without excessively reducing its reducing power.

These hydrogenation conditions are by far lower than the temperature and pressure conditions commonly described for decolourizing polydextrose by reducing it completely.

In a second method for decolourizing soluble starch derivatives containing nondigestible dietary fibres, the hydrogenation is carried out in the presence of a reducing agent selected from the group consisting of sodium borohydride and potassium borohydride, preferably sodium borohydride.

The hydrogenation is then performed with less than 0.5% on a dry basis of sodium borohydride and at a nonregulated pH of less than 9.

The applicant company has thus had the merit of having shown that it was possible to reconcile the decolorization of the soluble starch derivatives containing nondigestible dietary fibres by more than 50%, without the reducing sugar content decreasing by more than 30%, by very precisely selecting the quantities of borohydride at more than 0.5% on a dry basis, at room temperature and without pH regulation.

The applicant company has indeed shown that, for a solution of soluble starch derivatives containing nondigestible dietary fibres with a dry matter content of between 10 and 40% on a dry basis, preferably of between 15 and 25% on a dry basis, a quantity of borohydride greater than or equal to 0.5% on a dry basis makes it lose all its reducing power.

Other characteristics and advantages of the invention will emerge on reading the examples which follow. They are, however, given here only by way of illustration and without limitation.

EXAMPLE 1

There is prepared, in accordance with EP Patent 1,006,128, a solution of branched maltodextrins, containing 32% of 1-6 glucoside bonds, a reducing sugar content of 2.5%, a polymolecularity index of 2.15 and a number-average molecular mass Mn of 2480 g/mol, at a dry matter content of 20%.

The ICUMSA coloration is determined at a value of 900 units.

The hydrogenation of the said solution is carried out in the presence of Raney nickel catalyst in an amount of 5% on a dry basis, the hydrogen being supplied at a pressure of 40 bar. The reaction is carried out at three temperatures of 40, 80 and 130° C. for 1 hour, with stirring at 1600 rpm, in a 600 ml batch hydrogenation reactor.

The following Table I presents the ICUMSA coloration values and the reducing sugar content measured at the end of the reaction.

TABLE I

| Reaction temperature | ICUMSA coloration | | Reducing sugar content (%) | |
| --- | --- | --- | --- | --- |
| | Start | Hydrogenated | Start | Hydrogenated |
| 40° C. | 900 | 645 | 2.5 | 2.4 |
| 80° C. | 900 | 350 | 2.5 | 2 |
| 130° C. | 900 | 120 | 2.5 | 0.6 |

The hydrogenation conditions which best allow the most satisfactory reduction in coloration to be obtained, without excessively altering the reducing sugar content, are therefore those which set the hydrogenation temperature of a solution with 20% DM at a value of 80° C., for a pressure of 40 bar in 1 hour of reaction.

A hydrogenated soluble starch derivative containing nondigestible dietary fibres in accordance with the invention, that is to say whose ICUMSA coloration has been reduced by 60%, and reducing sugar content reduced by of the order of 20%, is then obtained.

A first additional study was undertaken in order to test the recycling of the catalyst during decolourizations of the said soluble starch derivatives containing nondigestible dietary fibre using Raney nickel. Four recyclings were performed, at 80° C., at 40 bar of hydrogen and for 1 hour of reaction, and the quality of the recycled catalyst was determined with respect to its capacity to hydrogenate glucose.

The measurement of the rate constant then makes it possible to estimate the evolution of the catalyst. It was thus found that even if the catalyst showed a slight decrease in activity, the coloration of the final product varying from 350 to 450 with the recyclings, the rate constant remains constant at 1.3 Rch$^{-1}$, which is identical to the fresh catalyst. It is therefore quite possible to envisage recycling of the catalyst.

A second additional study was carried out to determine the stability of the coloration of the products at acidic pH. The hydrogenated soluble starch derivative containing nondigestible dietary fibres in accordance with the invention having an ICUMSA coloration of 350 units is chosen. The starting product has an ICUMSA coloration of 900 units. The test of stability is therefore carried out by measuring the ICUMSA coloration of a solution at variable pH (acidic, neutral and basic) containing 500 g/l of the product to be tested heated for 15 minutes at 80° C.

The following Table II presents the coloration values obtained before and after heat treatment.

TABLE II

| | Acidic pH = 4.5 to 5 to 15 min | | Neutral pH = 6.9-7 to 15 min | | Basic pH = 9.8-9.9 to 15 min | |
| --- | --- | --- | --- | --- | --- | --- |
| Starting product | 900 | 940 | 940 | 1060 | 1060 | 5595 |
| Hydrogenated product in accordance with the invention | 350 | 325 | 350 | 675 | 600 | 7700 |

The results show that the products thus decolourized have a remarkable stability at acidic pH, which allows the use of the soluble hydrogenated starch derivatives containing nondigestible dietary fibres in accordance with the invention in food sectors where the absence of coloration under acidic preparation conditions is required for the applications envisaged.

EXAMPLE 2

There is prepared a solution of indigestible dextrins, marketed by MATSUTANI under the trade mark FIBERSOL 2E, with a dry matter content of 20%.

The ICUMSA coloration is determined at a value of 1450 units.

The hydrogenation of the said solution is carried out in the presence of Raney nickel catalyst in an amount of 5% on a dry basis, the hydrogen being supplied at a pressure of 40 bar. The reaction is carried out at a temperature of 80° C. for 1 hour, in accordance with the optimized conditions of Example 1, with stirring at 1600 rpm, in a 600 ml batch hydrogenation reactor.

The following Table III presents the ICUMSA coloration values and the reducing sugar contents measured at the end of the reaction.

TABLE III

| Reaction temperature | ICUMSA coloration | | Reducing sugar content (%) | |
| --- | --- | --- | --- | --- |
| | Start | Hydrogenated | Start | Hydrogenated |
| 80° C. | 1490 | 740 | 8.8 | 6.6 |

There is then obtained a hydrogenated soluble starch derivative containing nondigestible dietary fibres in accordance with the invention, i.e. whose ICUMSA coloration has been reduced by 51%, and reducing sugar content reduced by of the order of 25%.

EXAMPLE 3

There is prepared a solution of branched maltodextrins, containing 32% of 1-6 glucoside bonds, a reducing sugar level of 2.5%, a polymolecularity index of 2.15 and a number-average molecular mass Mn of 2480 g/mol, with a dry matter content of 20%, which is identical to that of Example 1. The ICUMSA coloration is 900 units.

There is added 0.1% on a dry basis of sodium borohydride at room temperature and at atmospheric pressure, and the reaction is allowed to proceed for 1 hour without pH regulation. The final reaction pH is 8.5.

A product is obtained which has an ICUMSA coloration of 200 units, for a reducing sugar content of 1.8%.

There is thus obtained a hydrogenated soluble starch derivative containing nondigestible dietary fibres in accordance with the invention, i.e. whose ICUMSA coloration has been reduced by 78%, and reducing sugar content reduced by of the order of 28%.

The invention claimed is:

1. A water-soluble hydrogenated starch derivative obtained by decolourizing a branched maltodextrin under conditions wherein the hydrogenation of the starch derivatives is carried out with hydrogen in the presence of a catalyst performed at a temperature between 30 and 90° C.; or
by hydrogenating the branched maltodextrin under conditions wherein the hydrogenation of the starch derivatives is carried out in the presence of sodium borohydride in an amount less than 0.5% on a dry matter basis and at a nonregulated pH of less than 9 performed at room temperature;

so that the ICUMSA coloration value is reduced by at least 50% and the reducing sugar content thereof is not reduced by more than 30% compared with the branched maltodextrin before the hydrogenating is performed, and wherein the water-soluble hydrogenated starch derivative has an ICUMSA coloration value of at most 800 units, and a reducing sugar content of at least 6% on a dry matter basis.

2. The water-soluble hydrogenated starch derivative according to claim 1, whose ICUMSA coloration value is stable in acidic medium.

3. The soluble hydrogenated starch derivative according to claim 1, having an ICUMSA coloration value of at most 750 units, and a reducing sugar content of at least 6% on a dry matter basis.

4. The water-soluble hydrogenated starch derivative according to claim 1, having a reducing sugar content of a least 2% on a dry matter basis, and an ICUMSA coloration value of at most 400 units.

5. A water-soluble hydrogenated starch derivative obtained by decolourizing a branched maltodextrin by hydrogenating the branched maltodextrin under conditions wherein the hydrogenation of the starch derivatives is carried out with hydrogen in the presence of a catalyst performed at a temperature between 30 and 90° C.; or by hydrogenating the branched maltodextrin under conditions wherein the hydrogenation of the starch derivatives is carried out in the presence of sodium borohydride in an amount less than 0.5% on a dry matter basis and at a nonregulated pH of less than 9 performed at room temperature;

so that the ICUMSA coloration value is reduced by at least 50% and the reducing sugar content thereof is not reduced by more than 30% compared with the branched maltodextrin before the hydrogenating is performed, and wherein the water-soluble hydrogenated starch derivative has an ICUMSA coloration value of at most 400 units, and a reducing sugar content of at least 2% on a dry matter basis.

6. The soluble hydrogenated starch derivative according to claim 5, wherein the water-soluble hydrogenated starch derivative has:

an ICUMSA coloration value of at most 350 units, and a reducing sugar content of at least 2% on a dry matter basis.

7. A food product containing the soluble hydrogenated starch derivatives according to claim 1.

8. A method for decolourizing branched maltodextrin, comprising hydrogenating said starch derivative under conditions such that the reducing sugar content thereof is not reduced by more than 30% and the ICUMSA coloration value is reduced by at least 50%, compared with the branched maltodextrin before the hydrogenating is performed, and wherein the water-soluble hydrogenated starch derivative has an ICUMSA coloration value of at most 800 units, and a reducing sugar content of at least 6% on a dry matter basis;

wherein the hydrogenation of the starch derivatives is carried out with hydrogen in the presence of a catalyst performed at a temperature between 30 and 90° C.; or wherein the hydrogenation of the starch derivatives is carried out in the presence of sodium borohydride in an amount less than 0.5% on a dry matter basis and at a nonregulated pH of less than 9 performed at room temperature.

9. The method according to claim 8, wherein the catalyst is selected from the group consisting of nickel, ruthenium, palladium and platinum.

10. The method according to claim 8, wherein the hydrogenation is performed with the catalyst at a pressure of between 1 and 50 bar, for a period of 0.5 to 5 hours.

11. The method according to claim 8, wherein the starch derivative to be hydrogenated with the catalyst has a dry matter content between 10 and 40% on a dry matter basis.

* * * * *